United States Patent [19]
Payne

[11] Patent Number: 5,242,273
[45] Date of Patent: Sep. 7, 1993

[54] METHOD AND APPARATUS FOR INTERNAL COMBUSTION ENGINE COOLANT EXTRACTOR/INJECTOR

[76] Inventor: Gerry E. Payne, 1455 Pratt Hwy., Birmingham, Ala. 35214

[21] Appl. No.: 760,709

[22] Filed: Sep. 16, 1991

[51] Int. Cl.⁵ .............................................. F04F 1/06
[52] U.S. Cl. .................................. 417/149; 417/118; 417/148; 165/95
[58] Field of Search ............... 417/118, 122, 148, 149; 165/1, 95

[56] References Cited

U.S. PATENT DOCUMENTS

| | | | |
|---|---|---|---|
| 3,310,002 | 3/1967 | Wilburn | 417/149 |
| 3,730,647 | 5/1973 | Lonardo | 417/122 |
| 3,780,757 | 12/1973 | Jordan | 137/205 |
| 4,770,611 | 9/1988 | Heyl | 417/147 |
| 4,901,786 | 2/1990 | Vataru et al. | 165/1 |
| 4,911,211 | 3/1990 | Andersen | 141/7 |

FOREIGN PATENT DOCUMENTS

| | | | |
|---|---|---|---|
| 492078 | 9/1938 | United Kingdom | 417/149 |
| 2086488A | 5/1982 | United Kingdom | 417/118 |

Primary Examiner—Allen J. Flanigan
Attorney, Agent, or Firm—L. F. Hilbers

[57] ABSTRACT

An automobile coolant extractor/injector comprises a tank assembly, an air pressure control assembly and a hose assembly. The air pressure control assembly creates a vacuum in the tank assembly by using the venturi effect. The air pressure control assembly does this by connecting to a compressed air hose. The air from the air hose flows through a venturi chamber creating a vacuum. The vacuum forces air out of the tank, creating a vacuum in the tank. A transfer hose is also connected to the tank. The transfer hose is inserted into an automobile radiator, and opened. The vacuum in the tank pulls coolant out of the radiator through the transfer hose and into the tank. Coolant is injected or reinjected into the radiator by increasing the air pressure inside of the tank. A Schraeder valve on the tank connects to a compressed air hose. Air flows into the tank through the Schraeder valve until the inside of the tank reaches the necessary air pressure. When the desired air pressure level is reached, as determined by an air pressure gauge connected to the tank, the compressed air hose is removed from the Schraeder valve. The open end of the transfer hose is then inserted into an automobile radiator, and the main rotary valve is opened. The increased pressure inside of the tank forces coolant out of the tank, through the transfer hose, and into the automobile radiator.

5 Claims, 3 Drawing Sheets

METHOD AND APPARATUS FOR INTERNAL COMBUSTION ENGINE COOLANT EXTRACTOR/INJECTOR

BACKGROUND OF THE INVENTION

I. Field of the Invention

This invention relates generally to a method and apparatus for removing a fluid from or injecting a fluid into a container, and more particularly to a new method and apparatus for removing coolant from and installing coolant into an internal combustion engine radiator.

II. Prior Art and Other Considerations

Studies show that over-heating is a major cause of vehicle breakdowns on highways. Engine cooling systems must operate efficiently at all times to avoid costly repairs that result from excessive temperature. In this regard, cooling systems contaminated by rust, scale build-up and sludge cannot provide adequate heat transfer and cooling system efficiency; in addition, thermostats fail to open, hoses deteriorate, impellers bind or break-off and engine blocks can become distorted or cracked. Accordingly, there is a need for efficient engine cooling system flushing methods and apparatus; however, flushing of such systems in the past required draining of the removed liquid to sewer or waste lines, which was environmentally objectionable. Accordingly, need had developed for apparatus and method to clean engine coolant systems without such drainage. No way was known for accomplishing this objective in the usually advantageous manner as is now provided by this invention.

Many motor vehicles have a water circulation system comprising a radiator, engine block and heater. Many problems are caused by the accumulation of debris in the form of rust or scale or other deposits in the system which impede the flow of the water and the conduction of heat. In the engine block itself the deposits may lead to the build-up of excessive heat and consequently to undue wear or even failure of certain components. Much the same may happen if the deposits clog the radiator or the heater.

To prevent the accumulation of deposits it is known to drain and flush the water circulation system from time to time. Flushing generally take place by opening the system at a low point to allow drainage of water through the engine block or heater, and the pressure of the flushing water is low. Flushing agents which tend to remove deposits from the walls of the passages making up the system are sometimes used to enhance the effectiveness.

A further complication is the presence of the customary thermostat in one of the conduits connecting the engine to the radiator. At the temperature of water for flushing supplied from the mains, the thermostat will normally be closed and will impede effective flushing. Removal of the thermostat may assist flushing, but substantially increases the laboriousness of the flushing operation.

Moreover, todays automobiles having high tech sophisticated computerized engines require proper maintenance of their cooling system. These automobiles have many sensors and switches which operate by sensing the temperature of the coolant in the cooling system. They perform many functions, such as controlling valves, solenoids and cooling fans, etc. Sensors also supply the on board computers with the engine temperature at the different stages of operation. The computer uses this information along with much more to control fuel injection, engine timing, engine idle, etc.

A consequence of these difficulties and complexities is that effective flushing is seldom carried out in routine maintenance of motor vehicles and similar machine having cooling systems, and as a result much engine wear—sometimes computed at more that 50%—is caused by poor circulation of cooling water; and if cooling systems are not properly maintained, many areas of engine control can be affected, such as performance, exhaust emissions, and fuel mileage.

Vehicle manufactures typically advise owners of their vehicles to change the antifreeze in the cooling systems of these vehicles every two years, in order to prevent the accumulation of corrosion materials, such as rust and solder corrosion residue. The corrosion materials are formed as the corrosion inhibitors in antifreeze break down from heat over time. These corrosion materials reduce cooling system efficiency by interfering with the flow of coolant through the air/liquid heat exchanging fin-tubes of the radiator core. An effective cooling system is not only important for engine performance and life, but in many automobiles the transmission fluid is also cooled by circulation through the radiator. Further, the abrasive nature of the suspended corrosive materials increases the wear on water pump, hoses, thermostat, and heater core—and malfunction of cooling system components is said to be the number one cause of highway breakdowns.

Accordingly, there are certainly good reasons why the vehicle makers' recommendation that the old coolant be flushed out and replaced with fresh coolant every two years should be followed. However, industry data indicates that most (about 78%) of the antifreeze sold every year is sold to do-it-yourselfers. And, only 30% of these buyers say that they change their antifreeze regularly, instead of just adding more when needed. Moreover, it is likely that many within this 30% who say that they change their antifreeze are, in fact, only removing the old coolant and corrosion materials from the radiator, and not from the whole system.

To properly change the coolant in a vehicle cooling system, it is not only necessary to drain and flush out the radiator (which normally contains 40% to 50% of the coolant in the system), but it is also necessary to drain and flush out the engine block, heater core and connecting hoses, since the remainder of the coolant is in those areas. Draining and flushing of the radiator does not drain or flush the coolant from the engine block, heater and the connecting hoses, because the flow of coolant from the latter areas to the radiator is block by the thermostat, which is closed unless the system is at operating temperature. Opening up a cooling system which is closed and at operating temperature is not advisable because, in this state, the system is pressurized and opening it may result in hot coolant being sprayed on the operator. Thus, coolant changes should begin only with cold systems, but when the system is not pressurized, the thermostat is closed, and the flow of coolant from engine, heater and hoses to the radiator is blocked. As a result, those car owners who prudently start with a cold system and drain just the radiator are removing only the 40% to 50% of used coolant and suspended corrosion which is contained in the radiator, leaving the remainder in the rest of the system.

There are presently three general approaches an individual vehicle owner may follow to drain and flush old coolant and corrosion from the entire cooling system—not just the radiator. All have their drawbacks.

Consider first the continuous flushing technique utilized by some professional equipment, and some kits sold for do-it-yourself use [an example is a kit sold by First Brands Corporation (PRESTONE) under its trademark "FLUSH'N FILL"]. With this technique, a sealed connection must be made by installing a garden hose-coupled inlet tee ("T") in the cooling system. This is accomplished by cutting into a heater hose and installing the inlet "T" between the severed hose ends. With the radiator drain cock open, the radiator cap off, and the engine running (to keep the thermostat open), water is continuously admitted through the inlet "T" and circulated by the water pump, displacing old coolant which discharges through the radiator drain and the radiator cap neck. After a sufficient period of time, drainage clarity indicates that old coolant and corrosion have been displaced by clean water.

For a person who is not a mechanic, utilizing this continuous flushing approach presents a number of problems:

(1) Installing the inlet "T" requires that the correct hose and installation point be identified, that the reinforced hose be cut and that the "T" be properly installed so that it does not leak (the FLUSH'N FILL instructions recommend consulting a qualified mechanic if unsure).

(2) The approach generates a relatively large volume of waste liquid (up to 700% of cooling system capacity) flowing from both the radiator neck and the drain. This waste liquid is difficult to contain and usually is left to splash on the vehicle and the ground. Since antifreeze is composed largely of ethylene glycol, which is harmful or fatal if swallowed and is poisonous to animals, this method creates a hazardous environmental condition.

(3) The drain cock on the radiator must be opened and closed, respectively, before and after the operation.

Professional flushing equipment designed to contain waste coolant and flush liquid requires at least one additional sealed connection to be made to the cooling system, for purposes of conveying waster liquid out as flushing liquid is pumped into the system. This, of course, adds to both the cost and complexity of use of such systems.

A second method which may be used involves opening up the system at multiple points. With this approach the thermostat, heater hose and the lower engine-to-radiator hose are removed, and the drain cocks on the engine and the radiator are opened. It is then possible to flush water through the various parts of the system without the need to install a permanent inlet "T" or run the engine to keep the thermostat open. However, there are also problems with this approach.

Consider first the draining of old coolant and flush water from the radiator. The radiator can be drained by either opening the drain cock located on the engine side of the radiator near the bottom or by removing the bottom radiator to-engine hose, which is also located on the engine side of the radiator near the bottom of the radiator. (For complete flushing, the drain cock would be opened and the hose would be removed.) For a person who is not a mechanic, performing the seemingly simple task involves a number of practical difficulties:

(1) Either opening the drain cock or removing the bottom hose frequently requires the operator to get under the car, because there is insufficient room in the engine compartment: to pull hard enough on the bottom hose to remove it from the radiator mounting tube without damaging it or causing injury; or to use a wrench on the drain cock handle, which is intended for hand turning but frequently is stuck so tight by corrosion that it requires a wrench. Many automobiles do not have sufficient clearance to permit the operator to perform either of these operations without jacking up the car, with attendant danger.

(2) Use of a wrench on the handle of a drain cock stuck by corrosion involves a substantial risk of breakage, requiring either a difficult replacement of the drain cock or the more expensive replacement of the entire radiator.

(3) Even with the retaining clamp removed, radiator hoses frequently adhere so tenaciously to the radiator hose mounting tube (which, like the radiator itself, is made of light gauge, soft metal), that it is necessary to either cut the hose off the tube or to use a screwdriver or pry bar to push the hose off the tube. If cut, the hose must be replaced, and either cutting or prying the hose risks damage to the mounting tube itself, which again could result in the need to replace the radiator.

(4) Immediately upon opening the drain cock or hose, used coolant flows out, frequently resulting in both the operator and the ground being covered by the used coolant before a receptacle can be used to collect it.

Draining coolant and flush water from the engine block, the heater and the connecting hoses is an even greater problem:

(1) Engine drain cocks are generally even more difficult to access through the engine compartment that radiator drain cocks, and they more frequently require the operator to jack-up and get under the car to open and close them.

(2) Removal of the thermostat requires: unbolting a housing from the engine block; prying the thermostat loose from its gasket, and sealant upon re-mounting of the thermostat.

(3) Removal of heater hoses presents the same type of difficulties encountered in removing engine-to-radiator hoses, and replacement of the two heater hoses (which are very similar in appearance) in their proper location is an added problem.

(4) With the system open at many points for flushing purposes, it is difficult to collect the waste and flush water exiting these many openings when flush water is injected.

The third method of draining and flushing the entire cooling system involves repeatedly draining the radiator, refilling it with water, and running the engine to normal operating temperature. This causes the thermostat to open and permits the coolant previously trapped in the engine, heater and hoses to mix with the clean water added to the radiator. Because in a typical cooling system the water pump has the capacity to turn over many times the total system capacity every minute, and the thermostat, when open, will likewise permit many time the system capacity to circulate to the radiator each minute, the fresh water is quickly and thoroughly mixed with the remaining used coolant.

By repeating the sequence of steps, the amount of old coolant and corrosion remaining in the system can be reduced by approximately one-half each time the radiator is emptied. Thus, the first time the radiator is emptied, approximately one-half of the used coolant in the system is removed. After running the engine to mix the remaining used coolant with the fresh water, draining of the radiator reduces the remaining used coolant to onequarter of that initially contained in the cooling system. The third repetition reduces it to one-eighth; the fourth to one-sixteenth, etc.

In this way, the operator can flush a high percentage of the total old coolant and corrosion from his entire cooling system (not just the radiator) without the need to open drain cocks or hose connections on the engine. While mechanically simpler, however, this method nevertheless requires a great deal of physical labor. The operator must get under the automobile several times to open and close the radiator drain cock, or to remove and replace the bottom radiator-to-engine hose, whichever draining procedure is being used. Also, if the car has to be jacked up to take these actions it would have to be let down each time in order to run the engine. Thus, for example, to flush at least 87.5% of the old coolant from the system requires that the radiator be drained three times, which would require that the operator get under the automobile six times (three times to open the draining point and three more times to close the draining point). Further, after the first engine warm-up to open the thermostat, the operator would either have to open the drainage point on a hot radiator or wait some period of time for the system to cool down before proceeding.

Although a pump could be utilized to drain the radiator, in order to avoid the need to repeatedly open and close the drain cock, most automobile owners could not justify the cost of such a pump, nor would they be willing to undertake the storage and maintenance of such a pump.

Prior art devices are designed to remove fluids for disposal or to treat them and then return the fluids back into the system at the time the equipment is attached. These inventions do not have the capability of removing, containing, storing and reinstalling the fluids at a later time without the necessity of special adaption or modification to the cooling system.

Accordingly, while there are clearly good reason to flush out and recharge cooling systems in accordance with the vehicle maker's recommendations, many car owners do not do so because of the attendant difficulty of the task. Therefore, there are a great number of vehicles that are not serviced as they should be, with the associated high costs of: (1) poorer performance and more frequent maintenance; (2) shortened engine life; and (3) more frequent highway break down. Such costs could be reduced by providing a way for individual vehicle owners to properly flush their cooling systems and recharge them with fresh antifreeze, without the need substantial mechanical expertise and physical labor, or the need to acquire expensive pumping equipment.

SUMMARY

In view of the foregoing, it is an object of the present invention to provide a method and apparatus for effectively drawing engine coolant from an automobile radiator.

An advantage of the present invention is the provision of a method and apparatus wherein ethylene glycol can be disposed of properly instead of spilling it into the environment.

An advantage of the present invention is the provision of a method and apparatus that eliminates skin contact with ethylene glycol.

Another advantage of the present invention is the provision a method and apparatus which eliminates splashing and possible eye contact with ethylene glycol.

A further advantage by the present invention is the provision of a method and apparatus for facilitating the transportation of ethylene glycol to a proper disposal site.

Yet another advantage of the present invention is the provision of a method and apparatus to safely draw off pressure and expanded engine coolant from hot pressurized radiators.

A further advantage of the present invention is the provision of a method and apparatus to save time in draining and refilling an automobile radiator.

A further advantage of the present invention is the provision of a method and apparatus whereby automobile coolant and water can be mixed before filling an automobile radiator.

Yet another advantage of the present invention is the provision of a method and apparatus that saves money by eliminating spills of used coolant which could have been reused but must then be replaced with new coolant.

A further advantage of the present invention is the provision of a method and apparatus which allows a mechanic and his shop to stay clean so as to present a professional appearance.

A further advantage of the present invention is the provision of a method and apparatus for convenient, economical temporary storage of automobile coolant.

A further advantage of the present invention is the provision of a method and apparatus whereby the invention can be easily moved to a new location and then operated.

Yet another advantage of the present invention is the provision of a method and apparatus whereby many different fluids can be removed from a container.

A further advantage of the present invention is the provision of a method and apparatus which can completely drain an automobile coolant system of all coolant.

A further advantage of the present invention is the provision of a method and apparatus that is powered by equipment commonly found in an automobile shop.

Yet another advantage of the present invention is the provision of a method and apparatus that is relatively easy to use.

Still another advantage of the present invention is the provision of a method and apparatus that provides a quick and simple way for the removal of the coolant into a container that can be easily detached from the automobile and stored out of the way until such time that the coolant is to be reinstalled back into the system and then quickly reinstalled with no special adaption.

And finally, another advantage of the present invention is the provision of a method and apparatus for draining and collecting the coolant without the means of the drain cock, or in some cases when no drain cock is provided, without the necessary removal of the lower radiator hose and without significant loss of coolant.

In accordance with features of this invention, an, or other internal combustion engine radiator coolant extractor/injector, such as for an automobile engine, comprises a vacuum means, a pressurization means, a storage means, and an extraction means including a port. In use the vacuum means produces a vacuum by a venturi effect. Air rushes out of the storage means to fill the vacuum. The storage means is then sealed, leaving the interior of the storage means in a vacuum state. The extraction means is then inserted into the automobile radiator. When the extraction means is flowably connected to the storage means its port below the surface of the coolant in the radiator, the coolant rushes from the radiator into the storage means to fill the vacuum there.

When the coolant is desired to be injected back into the radiator, the pressurization means forces air into the storage means where it is stored. The extraction means is then inserted into the automobile radiator and opened. When the extraction means is opened the increased pressure in the storage means injects coolant into the automobile radiator.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
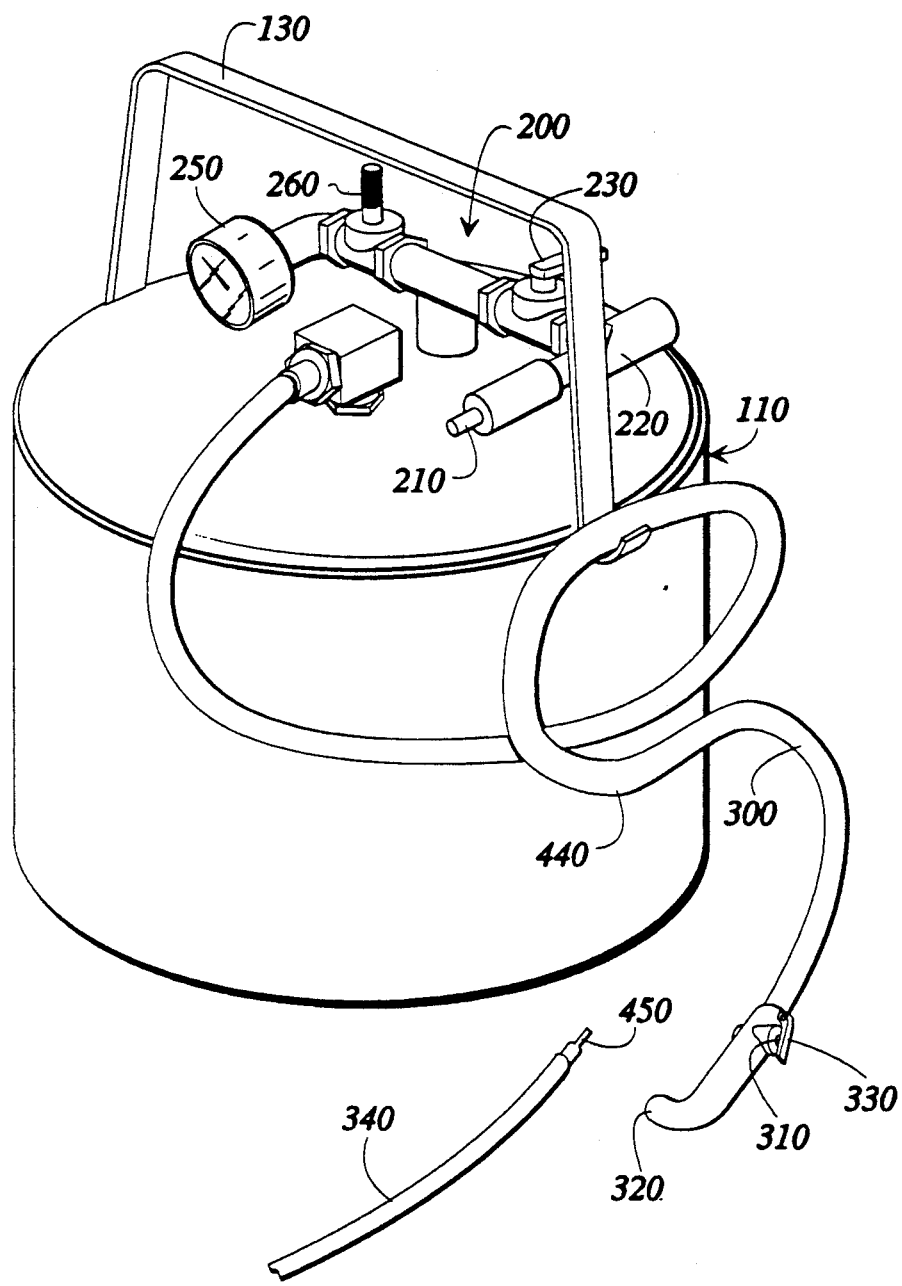
FIG. 1 is a perspective view of a first preferred embodiment of an automobile coolant extractor/injector having a pressure control assembly and a tank assembly.

The first preferred embodiment of the automobile radiator coolant extractor/injector of FIG. 1 comprises a tank assembly 100, a pressure control assembly 200, and a hose assembly 300. The tank assembly 100 comprises a tank 110 and a dip tube 120. The pressure control assembly 200 comprises a venturi connector 210, a venturi chamber 220, a venturi rotary valve 230, a vacuum line 240, an air pressure gauge 250, a Schraeder valve 260 and a T-connector 270. The hose assembly 300 comprises a main rotary valve 310, a hose connector 320, a valve handle 330, a wand 340, a transfer hose 440, and a wand connector 450.

Figure 4:
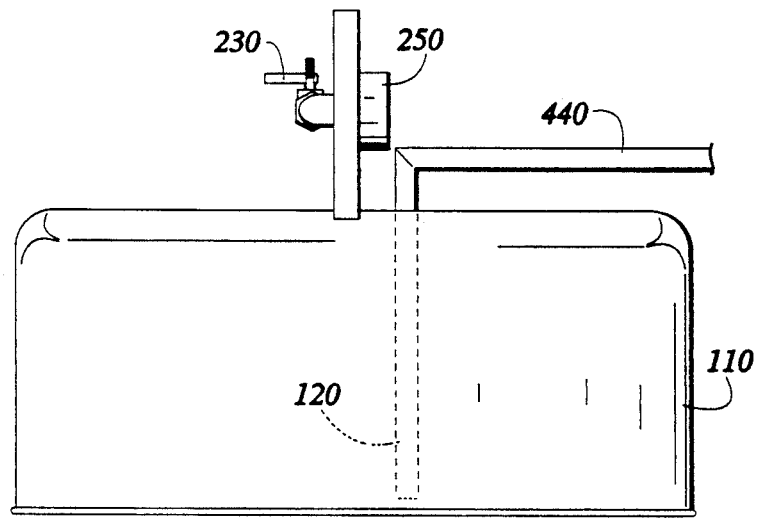
FIG. 4 is a cross-sectional view of the tank assembly of the first preferred embodiment of FIG. 2.
Figure 5:
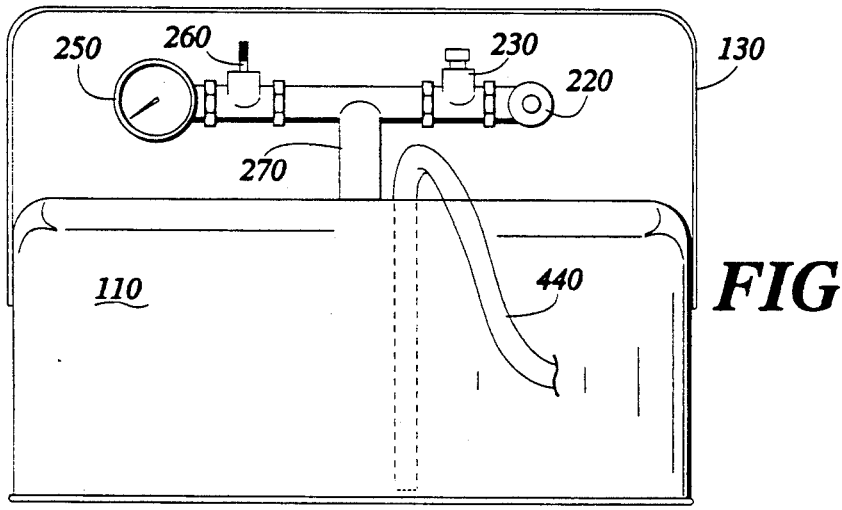
FIG. 5 is a side view of the pressure control assembly of the first preferred embodiment of FIG. 2.

The tank 110 is a closed container that is large enough to hold all of the coolant from an automobile. Inside the tank 110, as shown in FIG. 4, is the dip tube 120. The dip tube 120 extends from the top of the tank 110 to near the bottom of the tank 110. The lower end of the dip tube 120 is open to allow coolant to pass through it. The top of the dip tube 120 is connected to the transfer hose 440. The opposite end of the transfer hose 440 is connected to the main rotary valve 310. The valve handle 330 can press against the main rotary valve 310 and open the way for coolant to flow through the transfer hose 440. The hose connector 320 is attached to the main rotary valve 310, and can connect to the wand connector 450. The wand connector 450 connects the hose connector 320 and the wand 340. The wand 340 is a thin flexible tube that can be inserted into, and to the bottom of, an automobile radiator.

Figure 2:
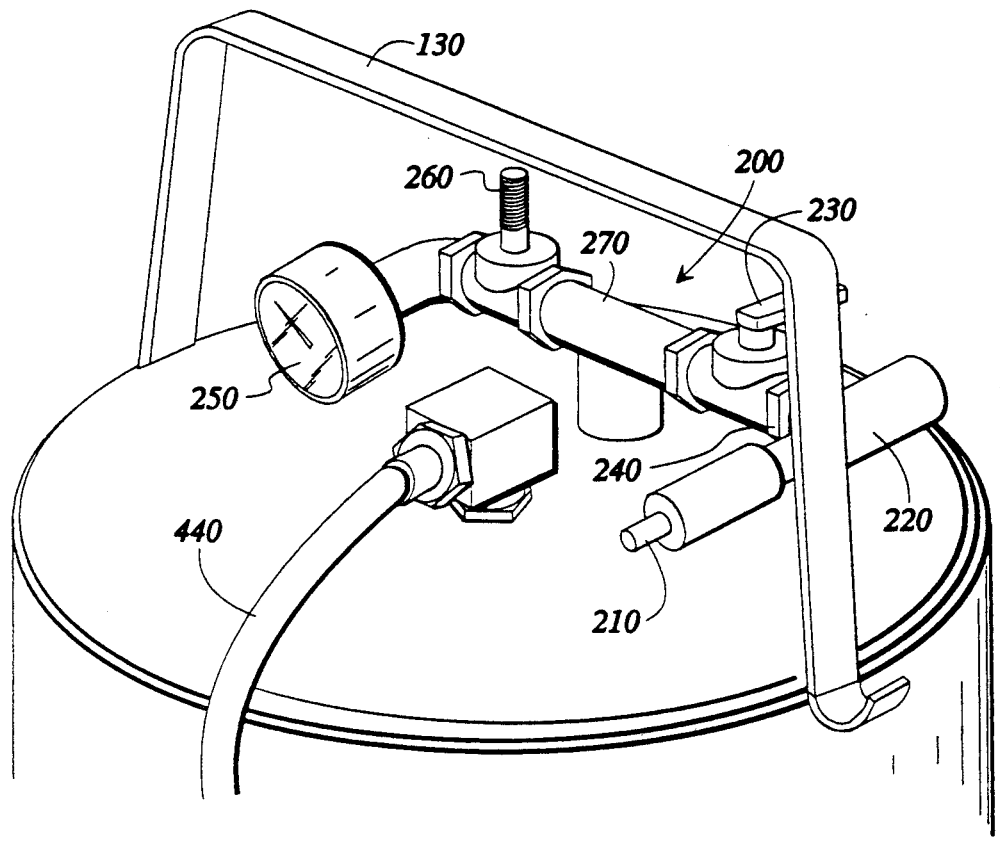
FIG. 2 is a perspective view of the pressure control assembly having a venturi chamber, of the first preferred embodiment of FIG. 1.

The air pressure control assembly 200, as shown in FIG. 2, controls air pressure in the tank 110. The bottom leg of the T-connector 270 connects the air pressure control assembly 200 to the tank 110. One of the top legs of the T-connector 270 is connected to one end of the venturi rotary valve 230. The other of the top legs of the T-connector 270 is connected to one of the connections of the Schraeder valve 260. One end of the vacuum line 240 is connected to the venturi chamber 220. The venturi connector 210 is also connected to the venturi chamber 220, and allows an air hose to be applied to the venturi chamber 220. The venturi rotary valve 230 is connected to the other end of vacuum line 240. The venturi rotary valve 230 controls the flow of air into or out of the tank 110 by being able to close the vacuum line 240. The Schraeder valve 260 will accept application of an air hose. The air pressure gauge 250 is connected to the other connection of the Schraeder valve 260, and gauges the amount of air pressure or the amount of vacuum inside the tank 110.

Figure 3:
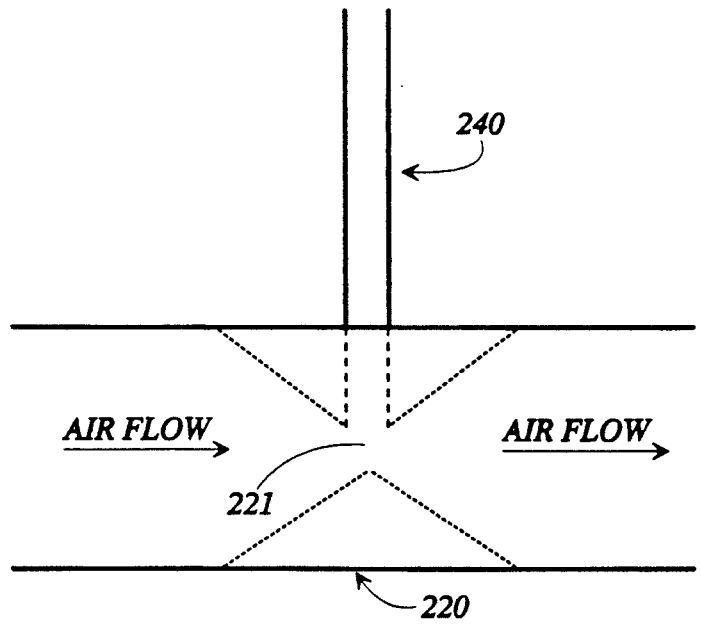
FIG. 3 is a cross-sectional view of the venturi chamber of the first preferred embodiment of FIG. 2.

To extract the coolant from a radiator a vacuum is first established in the tank 110. To establish a vacuum in the tank 110 the main rotary valve 310 should be closed, and the venturi rotary valve 230 should be open. A compressed air supply hose is connected to the venturi connector 210. Air from the hose is blown through the venturi connector 210 into the venturi chamber 220. The interior of the venturi, as shown in FIG. 3, chamber 220 is shaped like two cones touching point to point at a connecting point 221, with the vacuum line 240 intersecting at the connecting point 221. When air blows from the venturi connector 210 thru the constricted opening at the connecting point 221, a vacuum is created in the vacuum line 240 by the venturi effect. This vacuum evacuates the air from the tank 110. The air pressure gauge 250 measures the amount of vacuum in the tank 110. When the air pressure gauge 250 reads the desired air pressure, the venturi rotary valve 230 is closed so that the vacuum is maintained in the tank 110. The air hose is then disconnected from the venturi connector 210.

The wand 340 is then inserted into the radiator of the automobile and pushed to the bottom of the radiator. The main gate valve 310 is then opened by pressing on the valve handle 330. The vacuum in the tank 110 causes coolant to be evacuated from the radiator, through the wand 340, through the main rotary valve 310, through the transfer hose 440, through the dip tube 120 and into the tank 110. When the air pressure inside the tank 110 is equal to the air pressure inside of the radiator, or when the fluid is substantially removed from the radiator, the fluid flow will cease. The valve handle 330 can then be released closing the main rotary valve 310. Virtually all of the coolant from the car should now be inside of the tank 110.

When desired the coolant can be injected back into the radiator by connecting an air hose to the Schraeder valve 260. Then the tank 110 is pressurized until it reaches the desired pressure. The wand 340 is disconnected from the transfer hose 440 and the open end of the transfer hose 440 is inserted into the radiator. The valve handle 330 is then pressed, opening the main rotary valve 310. The air pressure in the tank 110 will attempt to force the coolant out of the tank 110. The only exit is up through the dip tube 120. Thus the coolant will leave the tank 110 through the dip tube 120, into the transfer hose 440, through the main gate valve 310, and into the radiator.

Figure 6:
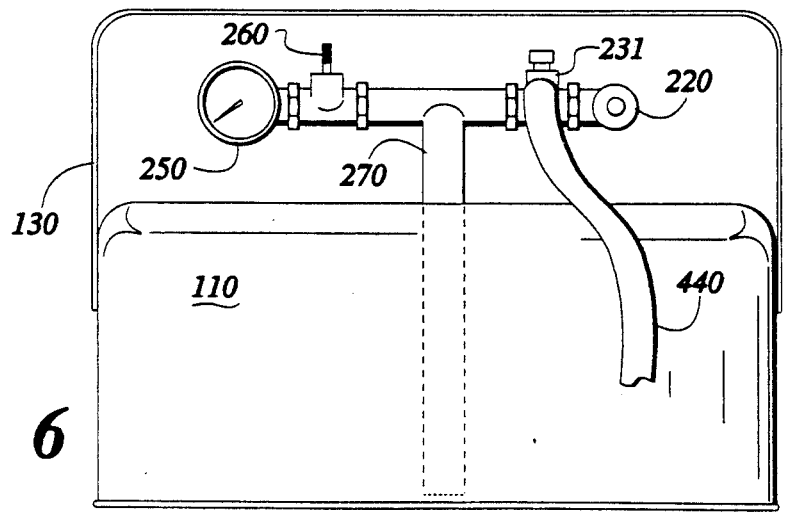
FIG. 6 is a side view of a pressure control assembly of a 2d preferred embodiment of an automobile coolant/injector.

The 2d preferred embodiment of the automobile radiator coolant extractor injector of FIG. 6 comprises the tank assembly 100, a 2d pressure control assembly 201, and the hose assembly 300. It is virtually identical to the 1st preferred embodiment except that the pressure control assembly 201 is attached at the top of the dip tube 120. There is no for the existence of an opening to coincide with the opening associated with the point of attachment of the pressure control assembly 200 in the 1st preferred embodiment.

The 2d pressure control assembly 201 is virtually identical to the first pressure control assembly 200. A difference is that the venturi gate valve 230 is replaced with a 3 position venturi gate valve 231.

The 3 position venturi gate valve 231 has three ports. One port is flowably connected to the venturi chamber 220 as in the 1st preferred embodiment. Another port is closed. The third port of the venturi gate valve 231 is flowably connected to the end of the transfer hose 440 which in the 1st preferred embodiment was attached to the top end of the dip tube 120, now connected to the second pressure control assembly 201.

The hose assembly 300 of the second preferred embodiment may be identical to the hose assembly 300 of the first preferred embodiment. However, the main gate valve 310 may be omitted. On the other hand, availability of the main gate valve 310 could be convenient.

While the invention has been particularly shown and described with reference to the preferred embodiments thereof, it will be understood by those skilled in the art that various alterations in form and detail may be made therein without departing from the spirit and scope of the invention.

INDEX OF REFERENCE NUMBERS

100: Tank Assembly
110: Tank
120: Dip Tube
130: Handle, Tank Assembly
200: Pressure Control Assembly
210: Venturi Connector
220: Venturi Chamber
230: Venturi Rotary Valve
231: Venturi Gate Valve, 3 position
240: Venturi Line
250: Air Pressure Gauge
260: Schraeder Valve
270: T-connector
300: Hose Assembly
310: Main Rotary Valve
320: Hose Connector
330: Valve Handle
340: Wand
440: Transfer Hose
450: Wand Connector.

INDEX OF PART NAMES

250: Air Pressure Gauge
120: Dip Tube
130: Handle, Tank Assembly
300: Hose Assembly
320: Hose Connector
310: Main Rotary Valve
200: Pressure Control Assembly
260: Schraeder Valve
270: T-connector 110: Tank
100: Tank Assembly
440: Transfer Hose
240: Vacuum Line
330: Valve Handle
220: Venturi Chamber
210: Venturi Connector 230: Venturi Rotary Valve
231: Venturi Gate Valve, 3 position
340: Wand
450: Wand Connector The embodiments of the invention in which an exclusive property or privilege is claimed are defined as follows:

1. An apparatus for a coolant extractor/injector for transportation of the coolant to and/or from an internal combustion engine radiator using a portable tank assembly comprising a tank with a top opening and a dip tube the top end of which is on the inside of the tank and which is connected to the tank top opening and using a pressure control assembly which is on the outside of the tank and which is connected to the tank top opening, comprising a venturi connector, a venturi chamber connected to the venturi connector, and an air pressure gauge connected to the tank top opening, means associated with said pressure control assembly for maintaining a pressure inside of said tank above or below the pressure outside of said tank independent of the presence of an operator and for moving a liquid into the tank or out of the tank independent of the source of gaseous pressure, and a closeable transfer hose assembly connected to the top end of the dip tube.

2. The apparatus of claim 1, wherein said means comprises:

a venturi valve, connected between the venturi chamber and the tank top opening, and a quick connect valve, connected to the tank top opening.

3. The apparatus of claim 1, wherein the transfer hose assembly comprises:

a transfer hose, connected to the tank top opening, a main valve, having an inner port and an outer port, the inner port being connected to the other end of the transfer hose, a hose connector, connected to the outer port, and a wand, connected to the other end of the hose connector.

4. A method of extracting and injecting coolant such as for transportation of the coolant to and/or from an internal combustion engine radiator, said method comprising the steps of:

introducing a vacuum in a tank assembly having a tank and a hose means;

storing the vacuum in the tank without the presence of an operator;

drawing the coolant through the hose means into the tank under the influence of the vacuum;

temporarily storing the coolant in the tank;

introducing gaseous pressure into the tank;

storing the pressure in the tank without the presence of an operator; and returning the coolant to its original environment from the tank through the hose means under the influence of the pressure.

5. An apparatus for a coolant extractor/injector for transportation of the coolant to and/or from an internal combustion engine radiator using a portable tank assembly comprising a tank with a top opening and a dip tube the top end of which is on the inside of the tank and which is connected to the tank top opening and using a pressure control assembly which is on the outside of the tank and which is connected to the tank top opening, comprising a venturi connector, a venturi chamber connected to the venturi connector, and an air pressure gauge connected to the tank top opening, means associated with said pressure control assembly for maintaining a pressure inside of said tank above or below the pressure outside of said tank independent of the presence of an operator and for moving a liquid into the tank or out of the tank independent of the source of gaseous pressure, and a transfer hose assembly connected to said means.

* * * * *